United States Patent [19]

Vining

[11] Patent Number: 4,574,491

[45] Date of Patent: Mar. 11, 1986

[54] LEVEL WITH AUDIO INDICATOR

[76] Inventor: Russell W. Vining, 1123 E. Broadway, Bradley, Ill. 60915

[21] Appl. No.: 635,146

[22] Filed: Jul. 27, 1984

[51] Int. Cl.$^4$ .............................................. G01C 9/06
[52] U.S. Cl. ...................................... 33/366; 33/367; 33/379
[58] Field of Search ................. 33/365, 366, 367, 379, 33/381

[56] References Cited

U.S. PATENT DOCUMENTS

| | | | |
|---|---|---|---|
| 1,251,349 | 12/1917 | Day | 33/366 |
| 2,600,363 | 6/1952 | Morris | 33/366 X |
| 3,172,212 | 3/1965 | Pappas | 33/366 |
| 3,657,695 | 4/1972 | Birmingham | 33/366 X |
| 3,660,840 | 5/1972 | Plofchan | 33/366 |
| 3,861,052 | 1/1975 | Siegfried | 33/366 |
| 4,079,521 | 3/1978 | Uhorczak | 33/366 |
| 4,152,839 | 5/1979 | McDonald | 33/366 |

FOREIGN PATENT DOCUMENTS 20476 of 1929 Australia ............................... 33/366
2078373 1/1982 United Kingdom ................. 33/366

Primary Examiner—Robert S. Ward
Attorney, Agent, or Firm—Hill, Van Santen, Steadman & Simpson

[57] ABSTRACT

A bubble level has at least two position sensing devices, such as mercury switches, disposed at right angles to each other and connected in a circuit having a three-position switch and an audio indicator, such as a buzzer. When the level is to be used to determine horizontal alignment, these switches move to a first position causing a horizontally disposed one of the position sensors to be cut into the circuit, while simultaneously cutting out the other position sensor. When the level is horizontally aligned, which may be in a position not in full view of the user, the position sensor completes the circuit and causes the audio indicator to sound. When the level is to be used to determine vertical alignment, the switch is moved to a second position, which cuts out the horizontal position sensor and cuts in the vertical position sensor and the same procedure can be undertaken. The switch has a central off position.

2 Claims, 4 Drawing Figures

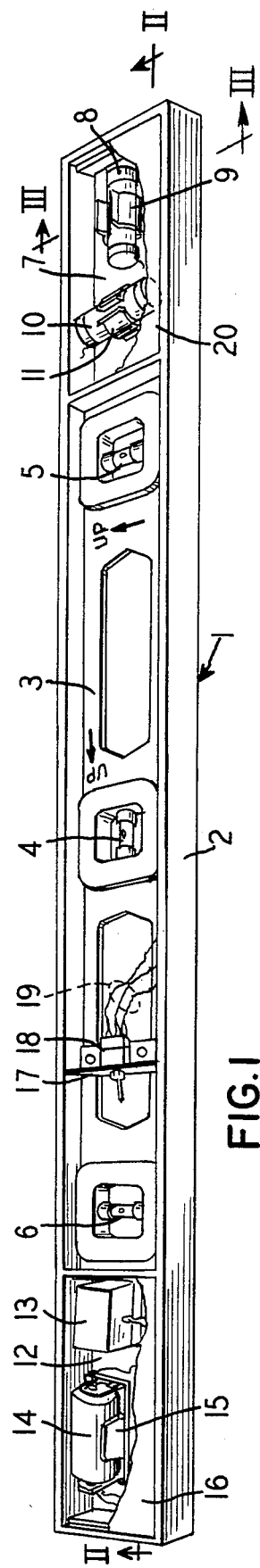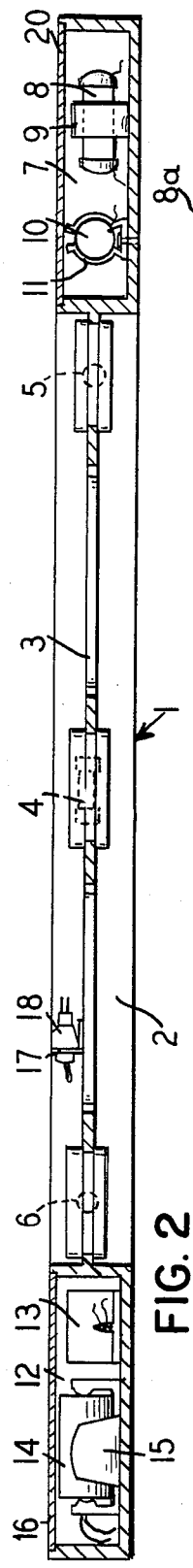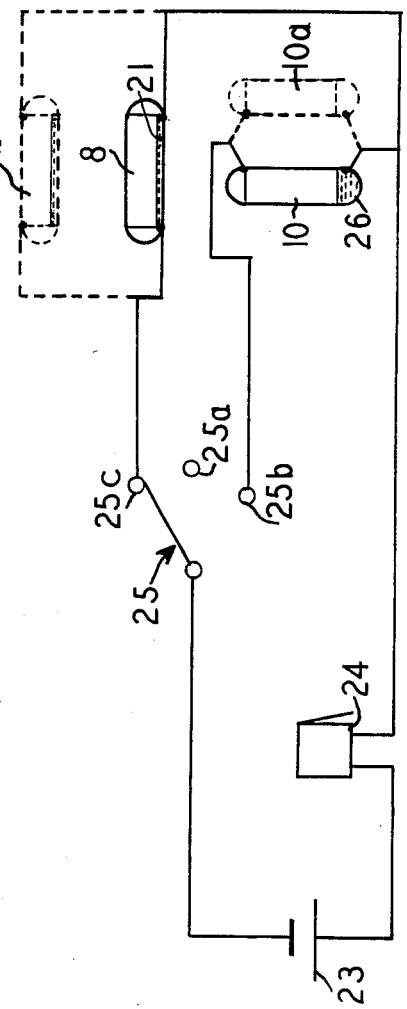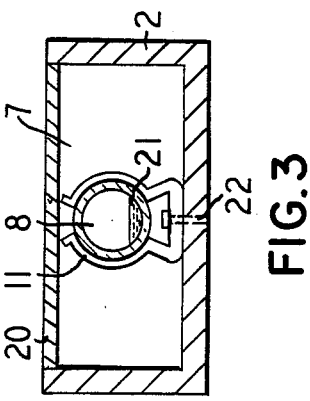

LEVEL WITH AUDIO INDICATOR

BACKGROUND OF THE INVENTION

The present invention relates to levels with a means for indicating when the level assumes a vertical or horizontal position when the level is not within the view of the user and in particular to such a level with an audio indicator which sounds when the level is precisely horizontally or vertically positioned.

Levels such as bubble levels are well known for use in carpentry, construction and related fields for determining when a particular object against which the level is placed is precisely horizontally or vertically disposed. Conventional levels, such as bubble levels, require that the level remain within the plain view or line of sight of the user so that the user can determine when the bubble or other visual indicator means is positioned so as to indicate vertical or horizontal alignment. The necessity of visually perceiving the indicator means requires the user to take sometimes cumbersome steps to obtain visual access to the level indicator, and in some instances may prevent use of the level altogether. Examples of such problem uses are placement of the level on the top of a door, behind an obstruction, or in cramped quarters.

SUMMARY OF THE INVENTION

It is an object of the present invention to provide a level with a non-visual indicator means which permits a user to determine when the level is vertically or horizontally level even when the level is out of the view of the user.

It is a further object of the present invention to provide such a level which emits an audio signal when horizontal or vertical alignment is achieved.

The above objects are inventively achieved in a level having at least two position sensors disposed perpendicular to each other for respectively sensing horizontal and vertical alignment of the level. The position sensors may, for example, be mercury switches. The position sensors are mounted within a circuit on a conventional level. The circuit includes a switch, a power supply and an audio indicator means, such as a buzzer. The position sensors are respectively connected in two branches of the circuit. When the switch is switched to a first position, one of the position indicators, such as the horizontal position indicator, is cut into the circuit, and the other position sensor, such as the vertical position sensor, is cut out of the circuit. When the level assumes a precisely horizontal position, the position sensor completes the circuit and causes the audio indicator to sound. When vertical alignment is to be tested, the switch is switched to a second position which causes the vertical position sensor to be cut into the circuit and the horizontal position sensor to be cut out of the circuit. Again, when the level assumes a precisely vertical position, the vertical position sensor completes the circuit and causes the audio indicator to sound. The switch also has a central off position to which the switch is switched when the level is not in use. The audio indicator permits a user to determine when the level has assumed a precisely vertical or horizontal position, even when the user cannot see the visual indicators provided on the level. The level can therefore be utilized in many situations wherein visual contact with the level is cumbersome or not possible.

DESCRIPTION OF THE DRAWINGS

FIG. 1 is a perspective view of a level with an audio indicator constructed in accordance with the principals of the present invention.

FIG. 2 is a sectional view of the level shown in FIG. 1 taken along line II—II.

FIG. 3 is a sectional view of the level shown in FIG. 1 taken along line III—III.

FIG. 4 is a circuit diagram for the audio circuit for the level shown in FIG. 1 constructed in accordance with the principals of the present invention.

DESCRIPTION OF THE PREFERRED EMBODIMENTS

A level having an audio indicator constructed in accordance with the principals of the present invention is shown in various views in FIGS. 1, 2 and 3. The level 1 has a frame 2 with a central mounting section 3. Within the mounting section 3 are disposed three conventional bubble levels, such as a horizontal bubble level 4 and vertical bubble levels 5 and 6. The bubble levels 4, 5 and 6 function in a conventional manner to provide a visual indication when the level 1 is precisely horizontally or vertically disposed.

The level 1 has a compartment 7 formed within the frame 2 at one end thereof in which are disposed a horizontal position sensor 8 rigidly held within a sensor retainer 9, and a vertical position sensor 10 rigidly held within a sensor retainer 11. The position sensors 8 and 10 may be mercury switches and the sensor retainers 9 and 11 may be spring retainer clips partially surrounding and receiving the sensors 8 and 10. The sensors 8 and 10 may also be rigidly held within the compartment 7 by potting compound, such as casting resin.

The level 1 has another compartment 12 disposed, for example, at an opposite end thereof within the frame 2. The compartment 12 contains an audio indicator 13, such as a buzzer, and a power source, such as a dry cell battery 14 held within a battery clip 15.

The level 1 also has a bracket 17 connected to the mounting surface 3 on which a switch 18 is mounted. The switch 18 is connected to the position sensors 8 and 10 through leads 19 as well as to the audio indicator 13 through the battery 14.

As best seen in FIG. 2, the compartment 7 may be covered by a cover 20 and the compartment 12 may be covered by a cover 16 to completely house the components respectively contained therein.

As stated above, the position sensors 8 and 10 may be mercury switches. As shown in detail in FIG. 3, each position sensor, such as the position sensor 8, has mercury 21 therein (the position sensor 10 having mercury 26 therein as indicated in FIG. 4). When the level 1 assumes a horizontal position, for example, the mercury 21 will collect along the bottom of the position sensor 8 thereby bridging the contacts at each end of the position sensor 8 and permitting a circuit to be completed through the sensor 8. Similarly, when the level 1 assumes a precisely horizontal position, the mercury 26 and the position sensor 10 will bridge the contacts at each end of the sensor 10. Several types of mercury switches suitable for use as the sensors 8 and 10 are commercially available. Some commercially available mercury switches have discontinuous contacts at the ends thereof, such that the mercury will make an electrical connection between the contacts only when it collects along one side of the switch, as shown for the sensor 8 in FIG. 4. If this type of mercury switch is utilized as the position sensors 8 and 10, the level 1 must be provided with indications as to which side of the level should be placed against the object in question in order to properly orient the position sensors. If the operable contacts for the horizontal position sensor 8, for example, are assumed to be as shown in FIG. 4, the level 1 must be positioned as indicated by the "UP" arrow closest to the bubble level 5, and for measuring vertical alignment, the level 1 must be positioned in the direction of the "UP" arrow adjacent to the bubble level 4, assuming the contacts for the vertical position sensor 10 are as shown in FIG. 4. Other mercury switches are commercially available which have a continuous metallization around each end of the switch so that any horizontal alignment of the sensor causes the mercury therein to bridge the contacts. If this type of mercury switch is utilized for the position sensors 8 and 10, it is not necessary to insure that a particular side of level 1 is against the object to be measured. It is also possible within the scope of the inventive concept disclosed herein to utilize pairs of position sensors, such as a pair of horizontal position sensors of the first-described type with their respective contacts oppositely disposed, so that either one of the sensors and the pair of sensors will make an electrical connection when horizontally disposed. Similarly, a pair of sensors with oppositely disposed contacts may be utilized in combination for determining vertical alignment. Such an additional horizontal position sensor with oppositely disposed contacts is indicated in dashed lines in FIG. 4, referenced 8a, and an additional vertical position sensor with oppositely disposed contacts is indicated in dash lines at 10a in FIG. 4.

The switch 17 has a wiper 25 movable between three contact positions 25a, 25b and 25c. When the level is not in use, the switch 17 is actuated so as to move the wiper 25 to the central position 25a, which is an "OFF" position, which cuts both of the position sensors 8 and 10 out of the circuit to prevent inadvertent draining of the battery 14. If the level is to be used, for example, to determine vertical alignment of an object, the switch 17 is actuated to move the wiper 25 to position 25b, and the level 1 is placed vertically against the object. When the level 1 is precisely vertically aligned, the mercury 26 in the position sensor 10 (or in the position sensor 10a) will bridge the contacts making a complete electrical circuit through the wiper 25, the sensor 10, the audio indicator 24 and the power source 23, causing the audio indicator 24 to sound. If horizontal alignment of an object is to be tested, the switch 17 is actuated so as to move the wiper 25 to the position 25c, and the level 1 is horizontally positioned adjacent the object to be measured. When precise horizontal alignment is achieved, the mercury 21 and the position sensor 8 (or in the position sensor 8a) will bridge the contacts, completing an electrical circuit through the wiper 25, the sensor 8, the audio indicator 24 and the power source 23, again causing the audio indicator 24 to sound. Horizontal or vertical alignment can thus be determined without the necessity of maintaining visual contact with the level, thereby permitting the level to be placed in hidden or inaccessible positions in which it could not otherwise be used.

It will be understood by those skilled in the art that any position sensor, such as mercury switches, will exhibit certain tolerances which, under some circumstances, may make an electrical connection even when the sensor is not precisely horizontally disposed, or may fail to make an electrical connection even when the sensor is precisely horizontally disposed. Therefore, as used in the specification and claims, the term "exactly horizontally disposed" and the term "exactly vertically disposed" is to be understood as meaning as exactly as is possible given manufacturing tolerances for the position sensors. It will also be understood by those skilled in the art that the terms "horizontally disposed" and "vertically disposed" as used herein refer to the relative positions of the sensors, that is, the mercury switches 8 and 10 (and 8a and 10a) when the level 1 is in the position shown in FIG. 1. When the level 1 is used to determine vertical alignment, the vertical position sensor 10 will actually assume a horizontal position, however, the sensor 10 is nonetheless a vertical position sensor, with "vertical" defining "position" rather than "sensor".

Although modifications and changes may be suggested by those skilled in the art, it is the intention of the inventor to embody within the patent warranted hereon all changes and modifications as reasonably and properly come within the scope of his contribution to the art.

I claim as my invention:

1. A level having a means for generating an audio indication when said level is exactly horizontally or vertically disposed, comprising:

a vertically disposed mercury switch having continuous end-face metallizations at opposing ends thereof, a first spring retaining clip securing said vertically disposed switch to a first inner portion at a first end of said level, a horizontally disposed mercury switch having continuous end-face metallizations at opposing ends thereof, a second spring retaining clip securing said horizontally disposed switch to a second inner portion at said first end of said level, an audio indicator mounted in a second opposite end of said level, an electrical circuit connected to said audio indicator and having first and second branches thereof electrically connected to respective ones of said vertically disposed switch and said horizontally disposed switch, a battery mounted in said second end of said level and electrically connected to said circuit, and a manually operable switch in said circuit being operable to connect alternate ones of said branches to said battery and to disconnect both of said branches from said battery.

2. A level as claimed in claim 1 wherein said switch is mounted at an intermediate location along said level.

* * * * *